United States Patent [19]
Kunert et al.

[11] Patent Number: 4,581,276
[45] Date of Patent: Apr. 8, 1986

[54] ADHESIVE BONDING MEANS FOR MOUNTING GLASS SHEETS IN A WINDOW APERTURE

[75] Inventors: Heinz Kunert, Cologne; Gerd Cornils, Merzenich-Girbelsrath, both of Fed. Rep. of Germany

[73] Assignee: Saint-Gobain Vitrage, Courbevoie, France

[21] Appl. No.: 614,016

[22] Filed: May 25, 1984

[51] Int. Cl.⁴ .................. B32B 3/02; B60J 1/00; E06B 3/00
[52] U.S. Cl. ...................... 428/157; 156/108; 156/500; 428/38; 428/43; 428/63; 428/80; 428/81
[58] Field of Search ............. 156/108, 293, 500, 285; 428/31, 38, 63, 80, 81, 83, 157, 192, 194, 43

[56] References Cited

U.S. PATENT DOCUMENTS

| | | | |
|---|---|---|---|
| 3,288,667 | 11/1966 | Martin | 428/38 |
| 3,574,024 | 4/1971 | Rose | 156/108 |
| 3,697,344 | 10/1972 | Temple | 156/285 |
| 4,260,439 | 4/1981 | Speer | 428/63 |
| 4,299,639 | 11/1981 | Bayer | 428/426 |

Primary Examiner—William J. Van Balen
Attorney, Agent, or Firm—Oblon, Fisher, Spivak, McClelland & Maier

[57] ABSTRACT

The invention relates to the mounting of a glass sheet, particularly a windshield, on the recessed surface in the sheet metal of the frame of an automobile body, by means of an adhesive strip. According to the invention, the strip is applied simultaneously by co-extrusion with a flexible wire or filament of high tensile strength, said application being over the entire periphery of the glass sheet. If it is found necessary to remove the glass sheet, the wire serves as a cutting element to cut the strip in two.

15 Claims, 12 Drawing Figures

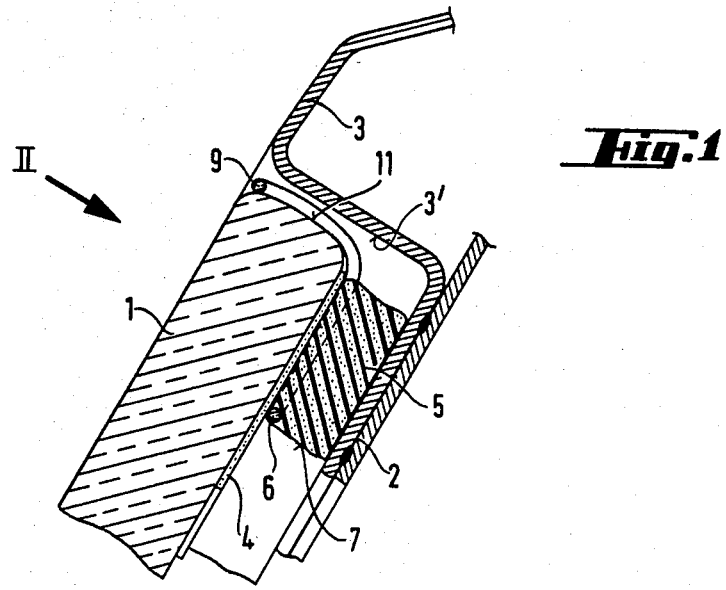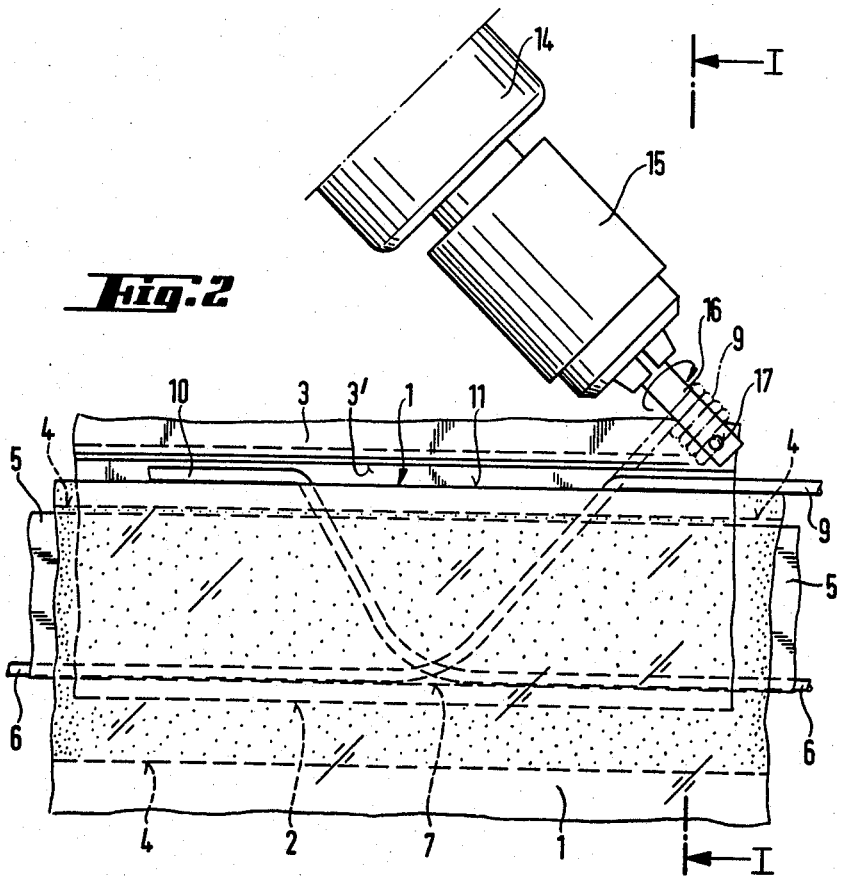

ADHESIVE BONDING MEANS FOR MOUNTING GLASS SHEETS IN A WINDOW APERTURE

BACKGROUND OF THE INVENTION

1. Field of the Invention

The subject of the present invention is a method for adhesively bonding glass sheets in a window aperture, particularly in a window aperture of the body of an automobile. In particular, a mounting method is proposed which enables the glass sheet to be removed easily if it is found necessary to do so. The invention is also directed to a glass sheet suited for use in said such a method, and a device (in the nature of a tool) for carrying out the method.

In the following description, reference will be made exclusively to automobile windshields; however, it should be understood that the invention may be applied to rear windows or any other windows of an automobile, as well as to the installation of windows in a building or vessel.

Currently there is a trend toward direct mounting of automobile windows onto the body, particularly in the case of front (windshields) and rear windows. A technique of this type is known whereby a strip of adhesive is deposited on the reverse side of the glass sheet, whereby a seal is formed between the two sides of the sheet, in the form of an opaque coating deposited along the periphery of the sheet. Such a system is described, for example, in German No. OS 20 38 016. After being applied in a plastic state, the strip of adhesive material hardens to produce the joint between the glass sheet and the window aperture in the automobile body.

If subsequently there is occasion to replace a glass sheet installed in this manner, a problem is presented. The adhesive strip must be detached, but there is difficulty in gaining access to it. There is a strong risk that the tools which must be employed for this purpose will damage the face of the glass sheet at its periphery. The hardness of the adhesive strip after polymerization greatly reduces the possibility of manipulating the glass sheet within the window aperture, and it becomes a laborious operation to cut or gouge the glass sheet free. It has been proposed to release the glass sheet by means of a tool in the form of a wire or the like, whereby the wire is pushed transversely into the adhesive strip and then longitudinally through said strip at the edges of the glass sheet.

SUMMARY OF THE INVENTION

It is an object of the invention to further improve the mounting of a glass sheet in a window aperture by direct adhesive bonding, by means of a mounting method which permits the glass sheet to be removed quickly and easily.

Toward this end, the invention proposes a method of mounting a glass sheet in a window aperture by adhesive bonding, whereby first an opaque facing is applied along the periphery of the glass sheet along with, if necessary or desirable, one or more primary adhesion-promoting layers, and then a shaped adhesive strip in a plastic state is applied on top of this, which strip may or may not effect direct adhesive bonding of the glass sheet to the window aperture, i.e., it may be an intermediary adhesive layer, and the glass sheet is affixed to the window aperture with the aid of said adhesive strip or an additional adhesive strip. According to the invention, a flexible wire or filament, in particular a metallic wire of apreciable tensile strength, is applied simultaneously with, and in the same direction as, the shaped adhesive strip. The wire may be disposed within the shaped strip itself or in proximity to it along its periphery and facing the body of the glass sheet.

According to the invention the flexible wire has the following function: If it is necessary for the adhesive strip to be cut, the wire serves as a tool for cutting it in two. To perform this cutting, the wire is freed at a predetermined location and is grasped at one end, then is caused to pass through the shaped strip of adhesive progressively along the periphery of the glass sheet.

According to a particularly advantageous embodiment of the invention, before the windshield is mounted in the window opening of the vehicle body and preferably after the windshield is fabricated, a shaped strip with an incorporated flexible wire may be deposited by extrusion along the edge region (margin) of the glass sheet. Later, at the time mounting is to occur, this strip, which has by now hardened, serves as an intermediary between the glass and an adhesive strip proper, i.e., another strip, which is to accomplish the ultimate adhesive bonding to the frame, which latter strip is deposited on top of the first strip. This embodiment of the invention is particularly advantageous, since a strip applied in the factory where the glass is manufactured may simultaneously serve as a spacer between glass sheets during their handling and shipping, and may protect their edges.

According to a supplementary feature of the invention, it is possible to utilize nearly all the tension force exerted on the wire to cut the adhesive strip in two, if a flexible wire is employed which adheres only weakly to the adhesive strip or which is surrounded by a sheathing or coated by a coating which reduces that adhesion. Particularly suitable coating materials include, e.g., separating agents based on wax or on silicone. In this way only a small amount of power is required to detach the wire.

In order to obtain the flexibility required for introducing the wire into a very viscous adhesive mass, it is advantageous in principle to employ a wire comprised of organic filaments having high tensile strength. Examples of such wires are nylon, Perlon, or preferably those based on poly-p-phenylenediamineterephthalamide. Such wires or filaments basically have a similar tensile strength to steel.

If necessary or desirable, a fine metallic wire may be wound helically around the above-described wire or thread, as an aid in cutting the adhesive strip. With such a structure, the ends of the metallic wire may be connected to a current source and thereby may be heated sufficiently to facilitate the cutting.

Stranded wires may also have sufficient flexibility, and may find use as the subject cutting wire.

The invention also relates to a glass sheet for an automobile, which sheet is particularly advantageous for use with a particular embodiment of the inventive method. Such a glass sheet is noteworthy in that at the time of mounting of the sheet in the window aperture the sheet is already covered along its edges with an adhesive strip, i.e., a strip forming part of the total gasket structure which has hardened, which hardened strip serves as an intermediate between the glass sheet and a supplementary adhesive strip which is brought into contact with a recess in the window aperture of the vehicle body. A flexible wire or the like having high tensile strenght is disposed in this (supplementary) part of the strip, in particular along the edge of the part directed toward the body of the glass sheet, and at least one of the ends of the wire is disposed on the end face of the glass sheet.

Finally, the invention also relates to a device for carrying out the method of the invention or for fabricating the inventive glass sheet, said device comprising, in its basic features, an extrusion nozzle having a shaped orifice, for depositing a highly viscous adhesive mass and provided with a conduit which guides a flexible wire or filament up to the shaped orifice. The wire is unwound from a supply spool and runs thence along a generatrix of the nozzle.

According to a variant of the invention, the cutting wire may be disposed in another profiled strip which is in addition to the unitary or layered, main strip as above described.

BRIEF DESCRIPTION OF THE DRAWINGS

Other characteristics and advantages of the invention will become apparent in the course of the following description of various embodiments of the invention with the aid of the attached FIGS. 1 to 10.

FIG. 1 shows a cross-section of a peripheral region of a windshield formed and held together according to the simplest embodiment of the invention, in a window aperture of a vehicle body;

FIG. 2 is an elevation view of the windshield of FIG. 1, with a device for withdrawing the wire which wire is embedded in the adhesive strip;

DETAILED DESCRIPTION OF THE PREFERRED EMBODIMENTS

Figure 3:
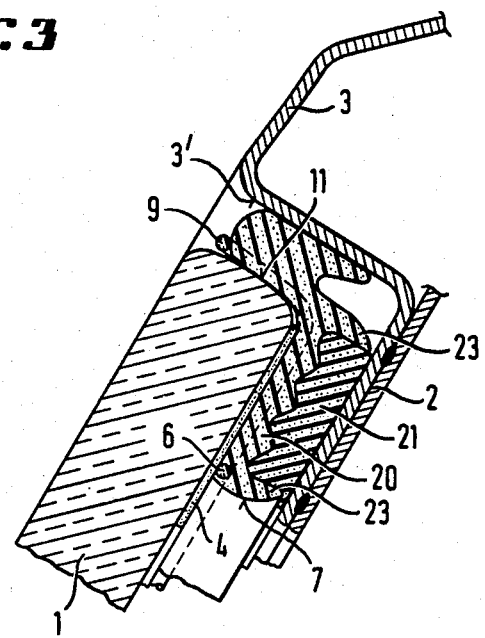
FIG. 3 shows a cross-section of a peripheral region of a glass sheet mounted with a shaped strip serving as an intermediate for the adhesive strip which provides the ultimate adhesive bond.

For convenience in illustration, the glass sheet 1 is shown as a simple type, but obviously any type of glass sheet can be mounted in an automobile body in the manner described. The sealing and attaching means proposed according to the invention are basically independent of the type of glass sheet employed. At the same time, the invention is particularly applicable to laminated glass windshields, due to the fact that this is the type of windshield currently in general use.

The windshield glass 1 is furnished with a facing 4 comprised of an opaque material, running over the entire periphery of the side of the glass facing the recessed surface 2 of theframe proper 3 of the body (FIG. 1). A strip of adhesive material 5 is deposited on the facing 4. A wire 6 is disposed in the interior of strip 5. The facing 4 may be comprised of porcelain enamel or a polymer. It plays a decorative role while also hiding the covered region of adhesive from external view through the glass. Further, it protects the adhesive strip 5 from UV radiation, and it may also be a means for improved adhesion of the adhesive strip 5 to the surface of the glass. A suitable ceramic paste for preparing the porcelain enamel may be chosen from among those commercially available, taking into account these factors. In particular, according to one method, enamel pastes are applied to the glass rsurface, e.g., by serigraphy, and these are fired in the course of the other required high temperature operations (such as the curving of the glass).

The glass sheet is adhesively bonded to the recessed sheet metal surface 2 of the body of the vehicle by the adhesive strip 5, which may be comprised, e.g., of butyl rubber or polyurethane, particularly a polyurethane of a composition which hardens in the presence of moisture.

The adhesive strip is applied to the surface of the facing 4 by means of a suitable extrusion nozzle. In this connection a device is employed which will be described in detail with the aid of FIGS. 6 to 10. With this device, the strip 5 and the cutting wire 6 are applied simultaneously.

The disposition of the flexible cutting wire 6 within the cross-section of the strip 5 is chosen such that, after application of the strip, the wire is disposed within the strip near the side 7 which faces the body of the glass sheet and on the surface of the facing 4.

The following is the method for applying the sealing means comprised of the strip and the wire, onto the glass, and for installing the glass in the window aperture of the vehicle body: Before the adhesive strip is applied, one end 9 of the wire is extended out and is bent onto the end face 11 of the glass sheet. Then the adhesive strip 5 incorporating the wire 6 is extruded and deposited onto the edge regions (margins) of the glass sheet. When the strip has been deposited in one complete circuit around the periphery of the glass sheet, the supply of adhesive from the extrusion nozzle is interrupted. An additional 10 cm of wire is withdrawn, and the end 10 thereof is bent around in generally the same manner as was done with the other end 9 (FIG. 2), whereby the wire is bent onto the end face 11 of the glass sheet after being passed through or over the adhesive strip. Only when this has been done is the glass sheet thus prepared placed against the side 3' of the recess, and is pressed against the recessed surface 2 of the sheet metal of the body. The ends 9 and 10 of the wire are then disposed in the space between the side 3' of the recess and the end face 11 of the windshield.

To remove the windshield, the following procedure may be employed, which is described with reference to FIG. 2: One of the ends 9 or 10 of the wire is pulled out of the space between the peripheral end face 11 of the glass sheet and the side 3' of the recess, and the strong tension is applied to said wire, whereby the adhesive strip 5 is sliced in two, whereupon the windshield can be easily removed. As shown in FIG. 2, the wire may be pulled with the aid of a drill device 14 with a controllable speed of rotation. In particular, a rod 16 having a transverse bore 17 transverse to the axis of rotation of the tool is mounted in the chuck 15 of the drill device. The end 9 of the wire is fixed in the said bore, and the wire is wound onto the rod by slow rotation of the rod. The wire can be withdrawn from the adhesive strip without difficulty.

In the embodiment shown in FIG. 3, the windshield 1 is again furnished with an opaque facing 4, e.g., of enamel. A shaped strip 20, containing the wire 6, is applied to this facing and adheres to the facing. The final disposition of the wire 6 is at the side 7 of the strip 20 which faces the mass of the glass sheet. According to the invention, the strip is applied on-site at the facility where the windshield is fabricated, and at the time when it is fabricated. It is extruded by basically the same method as used for the example of FIG. 1 (described above), with the appropriate extrusion nozzle. The intermediate shaped strip 20 hardens quickly after application, and thus protects the edges of the glass during shipping and storage. It is comprised of a plastic material which is compatible with and forms an air-tight joint with the adhesive strip 21 which strip 21 forms the ultimate adhesive bond. Strip 21 is applied either onto strip 20 or onto the recessed surface in the sheet metal of the body of the vehicle, at a time just prior to the pressing of the glass sheet onto the recessed surface 2 in the sheet metal of the body. Preferably the materials of which the strips 20 and 21 are comprised are plastics of the same type. In any event, the material of strip 20 should be slightly harder at the time of insertion of the glass into the window aperture than that of strip 21. Strip 20 is profiled on its side adjacent to adhesive strip 21, and further includes tongue members, i.e., "barrier projections" 23 directed toward the recessed surface 2 of the sheet metal and away from the glass sheet, so as to limit any spreading of strip 21. Strip 21 is not as thick as it would be if it were required to be the sole adhesive bonding agent of the glass sheet. Therefore it hardens more rapidly, and the time required for secure installation is thereby reduced. The strength and stability of the junction between the windshield and the vehicle body is increased as the adhesive material of the strip 21 undergoes hardening.

If the wire is disposed directly against the glass surface without the intermediate of the opaque facing 4, it may have a decorative function. If desired it may be colored or be given any other ornamental feature.

Figure 4:
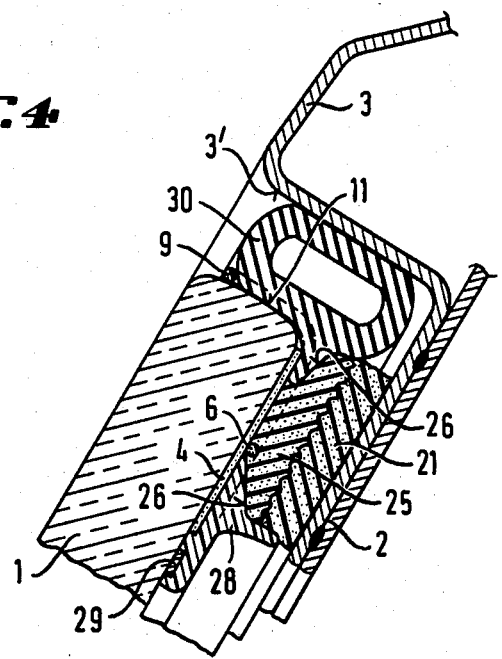
FIG. 4 shows a cross-section of another embodiment of a glass sheet mounting according to the invention.

FIG. 4 shows an exemplary embodiment of a mounting assembly including supplementary decorative seals. Here a profiled intermediate strip 25 is deposited by extrusion at the same time as a wire 6, onto an opaque facing 4. The sides 26 of the strip are recessed toward the rear, i.e., as the glass is approached along the normal to the glass surface, and in these regions on both sides the strip is penetrated by parts of supplementary profiled strips. One such strip 28 is inserted on the side facing the interior of the glass sheet, and is supplied with ornamentation on a band 29 on its face adjoining the surface of the glass. On the opposite side, a gasket 30 is inserted, filling the empty space between the peripheral end face 11 of the glass sheet and the side 3' of the aperture recess. An adhesive strip 21 bonds the glass sheet in place in the window aperture, by adhering to the recessed surface 2 of the sheet metal of the body on the one hand and to the strip 25 on the other.

Figure 5:
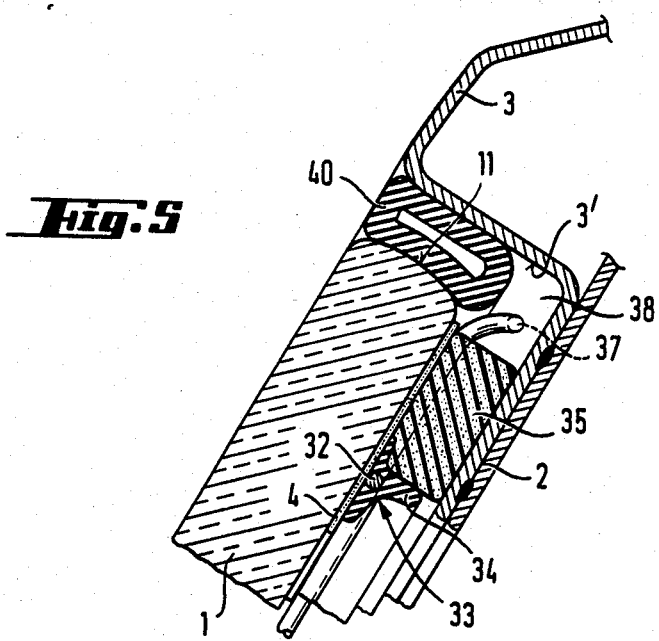
FIG. 5 shows an embodiment in which the wire is disposed in a supplementary profiled strip.

In the embodiment of FIG. 5, a wire 32 is embedded in a supplementary profiled strip 33 adhesively bonded to the internal side of an opaque facing 4. Profiled strip 33 includes a barrier projection 34 which acts as a detent and enables the limitation of any spreading of the adhesive strip 35 which is deposited subsequently onto the remaining exposed surface of the facing 4. The strips 35 and 33 may be applied simultaneously (one behind the other) or in sequence. The two free ends of the cutting element 32 are bent such that after the glass sheet 1 is mounted in the window aperture said ends may be disposed in the space 38 between the end face of the strip 35 and the frame 3 and 3' of the window aperture. The still unoccupied space between the frame (3, 3') and the peripheral end face 11 of the windshield is filled by an airtight gasket 40. When there is occasion to remove the windshield, the strip 35 is cut as described in connection with FIG. 2.

Figure 6:
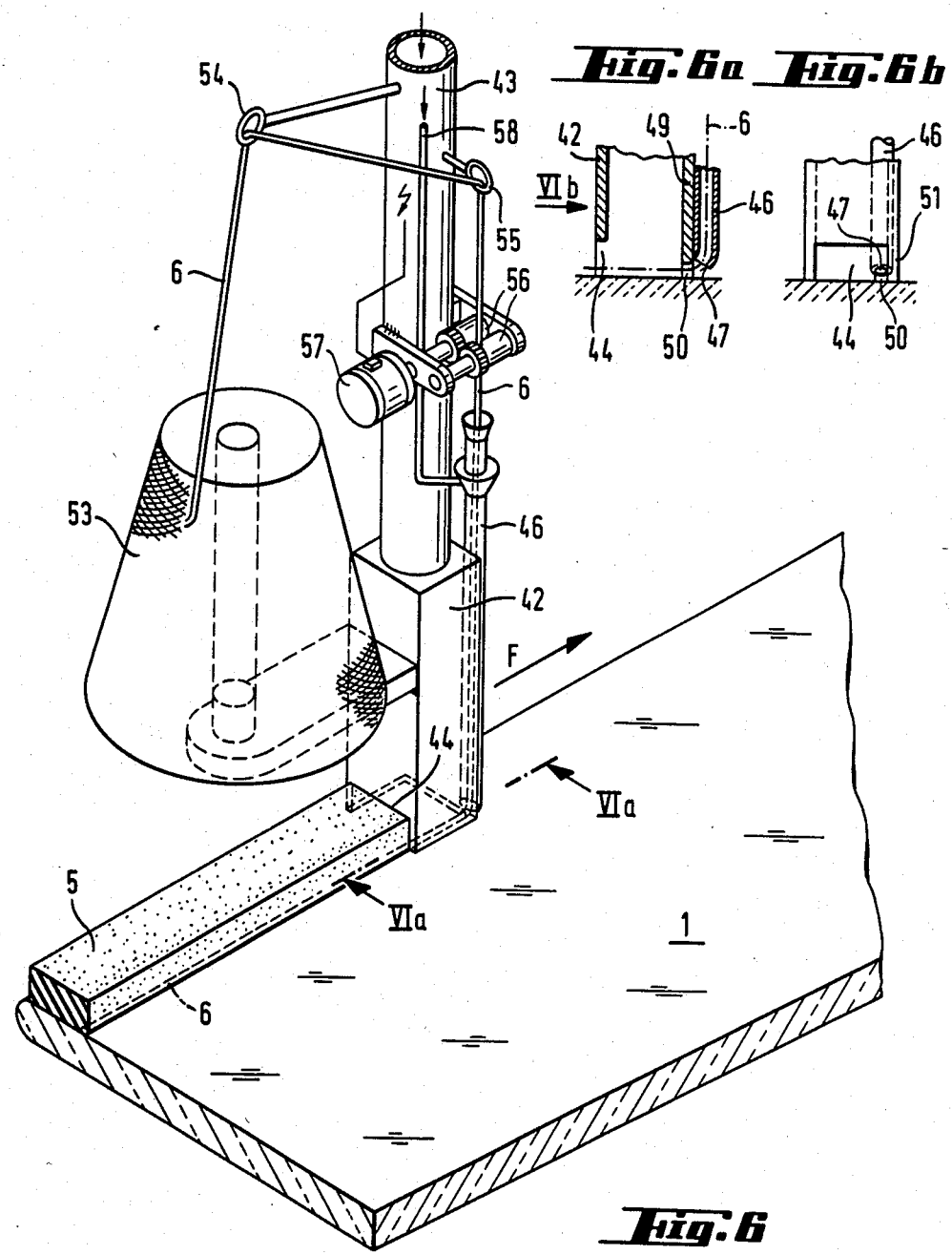
FIG. 6 shows a device for simultaneously depositing an adhesive strip and a wire to the surface of a glass sheet.

FIG. 6 shows a device for simultaneously depositing an adhesive strip 5 and a flexible cutting wire 6 onto the edge region (margin) of a glass sheet 1. The extrusion nozzle proper 42, comprises a segment of a square or rectangular conduit which has an upward projection in the form of a tubular segment 43. This tubular segment is connected in a manner not shown to guide eyelets 54 and 55, and thence wire is fed to conduit 46. The guide eyelets, the pair of feed reels 56, and the drive motor 57 for the reels are affixed to the conduit tubular segment 43. The motor 57 is controlled such that the flexible wire is advanced at the same speed at which the nozzle moves in direction F. In order to reduce friction between the wire and the internal wall of conduit 46, pressurized air is injected at the top of conduit 46 via a small tube 58. The air also simultaneously aids in the transportation of the wire in the conduit.

The advancement of the wire 6 and the movement of the nozzle are coordinated so that at the beginning and end of a deposition cycle of the adhesive strip the wire is unwound for a certain length without accompanying adhesive material, thereby providing the two end segments 9 and 10 which, when the glass sheet has been mounted in the window aperture, comprise the free ends which may be used to cut the adjesive strip in two. The respective movements of the strip and the wire are illustrated in detail in FIGS. 7 to 10.

Figure 7:
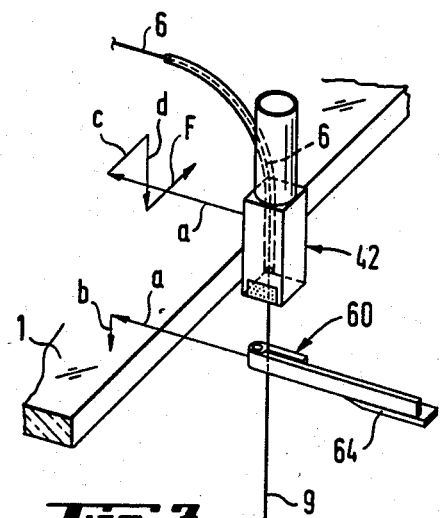
FIGS. 7 to 10 illustrate the sequence of steps in the method for simultaneously depositing the adhesive strip and the wire with the aid of the device of FIG. 6.

Before beginning the deposition of the strip and wire, i.e., in the position illustrated in FIG. 7, the nozzle 42 is disposed above the glass sheet 1 and slightly to the outside, i.e., beyond the lateral edge. A length of wire of about 10 cm is unwound as the motor 57 is started and air is injected into conduit 46. Then the wire is gripped with a clamp 60, and the nozzle 42 and clamp 60 are moved along simultaneously in the direction of arrow a, i.e., in a direction perpendicular to the end face of the glass sheet, so that material, i.e., adhesive and wire, can be supplied above the edge region (margin) of the glass sheet. The clamp is lowered to the glass sheet (arrow b), where it holds the wire in place on the surface of the glass. Meanwhile the nozzle 42 is moved slightly in direction c, is lowered onto the glass sheet, and begins movement in direction F.

Figure 8:
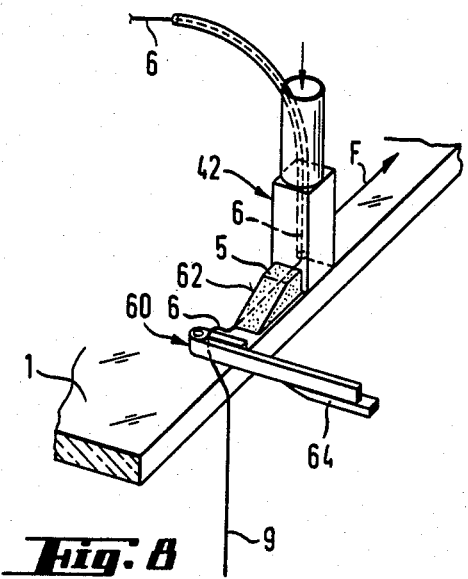

A short time after the movement of nozzle 42 is begun, the positions of the various parts of the device are as shown in FIG. 8. The wire 6 is still held in place by the clamp 60. After the movement of the nozzle 42 is begun, the pressure in the feed system for the adhesive material is increased, and the adhesive strip 5 takes on a cross-sectional shape 62 which is temporarily sloped but which then quickly attains the final desired thickness. The clamp 60 is opened and releases the wire 6, whereupon the clamp is raised back to its original position. The nozzle 42 continues along its path along the edge region (margin) of the glass sheet.

Figure 9:
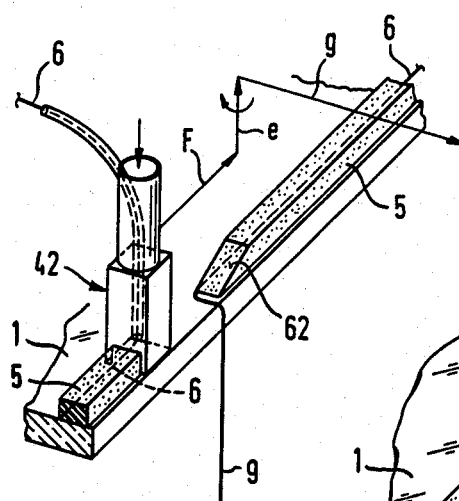
Figure 10:
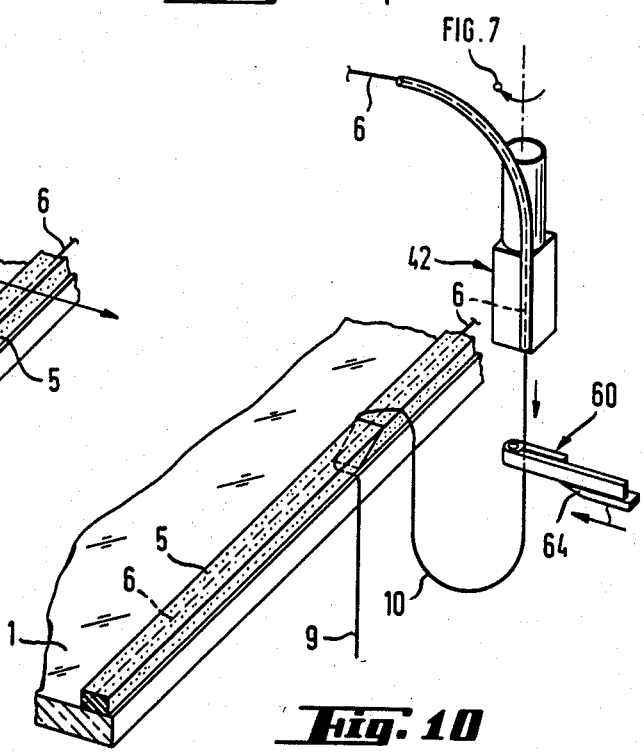

FIG. 9 illustrates the final phase in the deposition of the adhesive strip. After the nozzle has made an entire circuit around the glass and reached the region 62 corresponding to the beginning of the deposition, the pressure of the adhesive material is decreased, whereby the two ends of the strip are joined with no overlapping. Then the feed of adhesive material is completely stopped, with the nozzle in its final position, whence it is raised in direction e, is rotated 180° around its vertical axis, and is moved in direction g transversely to the edge of the glass sheet and toward the region exterior thereto. During this time the wire continues to be unwound, forming at the exterior of the glass sheet a bend or loop which will become the end segment 10 of the wire as shown in FIG. 10. The wire is then grasped by the clamp 60 and is cut by a cutter which operates simultaneously with the clamp. This concludes the deposition cycle. The glass sheet thus prepared is removed.

In a more advantageous variant of the invention, the nozzle 42 is guided by the arms of a robot. In this case all the movements are controlled from a central control unit, including the movements related to the advancement of the wire feed and the movements of the clamp 60 and the cutter 64.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for adhesively bonding a glass sheet in an aperture, comprising the steps of:
    applying an opaque facing along at least a portion of the periphery of said glass sheet;
    forming a first elongated shaped adhesive strip in a plastic state on said opaque facing;
    simultaneously providing on said opaque facing a flexible filament formed of a material having high tensile strength and having a length extending substantially parallel to said adhesive strip;
    permitting said adhesive strip to cure;
    providing a second adhesive strip on said first adhesive strip;
    positioning said glass sheet in said aperture with said glass sheet periphery being positioned adjacent a frame of said aperture and with said elongated first and second adhesive strip and said filament being positioned between said periphery and said frame; and
    permitting said adhesive strip to cure, whereby said glass sheet is bonded to said frame.

2. The method of claim 1 wherein said filament is positioned between said opaque facing and said first adhesive strip.

3. The method of claim 2 wherein said filament is positioned directly on said opaque facing.

4. The method of claim 1 including, prior to said positioning step, the step of bending at least one end of said filament out of parallel relationship with said adhesive strip and positioning said one end laterally beyond said periphery of said glass sheet, whereby said at least one end is located in a space between said periphery and said frame.

5. The method of claim 4 wherein after said adhesive strip has been applied over the entire periphery of the glass sheet, another end of the flexible wire is laterally bent beyond said periphery of the glass sheet while being caused to pass through or over the adhesive strip, whereby said another end is disposed in said space between said periphery and said frame.

6. The method of claim 1 wherein said filament is metallic and has a surface which adheres weakly to the adhesive strip.

7. The method of claim 1 wherein said filament is in the form of a stranded wire having high tensile strength.

8. The method of claim 1 wherein said filament is in the form of a thread comprised of organic fibers, said fibers having high tensile strength.

9. The method of claim 8 wherein said filament is comprised of fibers based on poly-p-phenylenediamine-terephthalamide.

10. A glass sheet for an automobile, intended to be directly adhesively bonded to the automobile body, said sheet comprising:
    a sheet element covered along an edge region with a hardened adhesive strip; and
    a flexible filament having high tensile strength disposed in, and parallel to the length of, the said hardened adhesive strip along said edge of the said strip, said filament being positioned between said glass sheet element and said adhesive strip, wherein at least one of the ends of said filament is disposed laterally beyond an edge of glass sheet element.

11. A device for applying an adhesive strip to a sheet, said device comprising:
    an extrusion nozzle having a shaped orifice;
    means for supplying a viscous adhesive material under pressure to said nozzle, whereby an adhesive strip may be extruded from said orifice;
    means associated with said nozzle for supplying a flexible filament; and
    guide means associated with said nozzle for guiding said filament to said orifice.

12. The device of claim 11, wherein said means for guiding said flexible filament comprises a conduit disposed outside of the nozzle, on a side opposite to said shaped orifice and an aperture in the wall of the nozzle and adjacent an end of said conduit.

13. The device of claim 12 including means for moving said nozzle, wherein said means for supplying said filament includes driven advancement reels which advance the flexible filament at a speed which coincides with that of said nozzle, wherein said reels are disposed upstream of said conduit.

14. The device of claim 12 including an air supply tube connected to a pressure source, and which has an outlet in said conduit.

15. The device of claim 11 including a clamp for grasping a free end of said filament, which clamp is movable in a direction perpendicular to an end face of said sheet.

* * * * *